US007970764B1

(12) United States Patent
Ershov

(10) Patent No.: US 7,970,764 B1
(45) Date of Patent: *Jun. 28, 2011

(54) GUI FOR SUBJECT MATTER NAVIGATION USING MAPS AND SEARCH TERMS

(75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/435,050

(22) Filed: May 4, 2009

Related U.S. Application Data

(63) Continuation of application No. 12/028,821, filed on Feb. 10, 2008, now Pat. No. 7,529,743, which is a continuation of application No. 11/957,281, filed on Dec. 14, 2007, now Pat. No. 7,610,185.

(60) Provisional application No. 60/891,542, filed on Feb. 26, 2007.

(51) Int. Cl.
*G06F 17/30* (2006.01)

(52) U.S. Cl. .......... 707/736; 715/853; 715/854; 706/20; 706/12; 707/737; 707/769; 707/777; 707/778

(58) Field of Classification Search .................. 706/12, 706/20; 715/853, 854; 707/736, 737, 741, 707/769, 777, 778
See application file for complete search history.

(56) References Cited

U.S. PATENT DOCUMENTS

| 6,166,739 | A  | * | 12/2000 | Hugh | 715/854 |
|---|---|---|---|---|---|
| 6,189,002 | B1 | * | 2/2001 | Roitblat | 1/1 |
| 6,304,864 | B1 | * | 10/2001 | Liddy et al. | 706/15 |
| 6,513,036 | B2 | * | 1/2003 | Fruensgaard et al. | 1/1 |
| 6,633,666 | B2 | * | 10/2003 | Gill et al. | 382/162 |
| 6,748,375 | B1 | * | 6/2004 | Wong et al. | 1/1 |
| 6,801,229 | B1 | * | 10/2004 | Tinkler | 715/853 |
| 6,868,525 | B1 | * | 3/2005 | Szabo | 715/738 |
| 6,931,604 | B2 | * | 8/2005 | Lane | 715/853 |
| 6,961,731 | B2 | * | 11/2005 | Holbrook | 1/1 |
| 7,251,637 | B1 | * | 7/2007 | Caid et al. | 706/15 |
| 7,284,191 | B2 | * | 10/2007 | Grefenstette et al. | 715/230 |
| 7,496,548 | B1 | * | 2/2009 | Ershov | 706/20 |
| 7,529,743 | B1 | * | 5/2009 | Ershov | 1/1 |
| 7,610,185 | B1 | * | 10/2009 | Ershov | 703/3 |

(Continued)

OTHER PUBLICATIONS

Shinodaira et al., A Divergent-Style Learning Support Tool for English Learners Using a Thesaurus Diagram, KES 2006, Part III.*

(Continued)

*Primary Examiner* — Jean M Corrielus

(57) ABSTRACT

A system, method and computer program product for navigating categorized information, including (a) a two-dimensional map displayed to a user on a screen, the map showing search terms relating to a subject matter, where the display of the search terms corresponds to relationship between the terms, and wherein a manner of display of the terms corresponds to their relative importance to the subject matter; and (b) a neural network underlying the map, wherein the manner of display and a selection of the search terms is derived from the neural network. The manner of display includes font color, font size, font transparency, distance between search terms and positioning of the search terms within the map. Positioning of a cursor over one of the search terms rearranges the search terms on the map to correspond to an increased relevance of the one of the search terms, while the cursor is over the one of the search terms. Clicking on the one of the search terms corresponds to navigating into a sub-subject matter of the one of the search terms.

24 Claims, 28 Drawing Sheets

U.S. PATENT DOCUMENTS 7,620,607 B1* 11/2009 Ershov .............................. 706/12
2005/0144158 A1* 6/2005 Capper et al. ...................... 707/3

OTHER PUBLICATIONS www.visualthesaurus.com|howitworks|manual|, Oct. 18, 2000, pp. 1-23.*

Dursteler, Juan C., InfVis, http/infovis.net/printMag.php?num=97&lang=2, KartOO, Aug. 19, 2002.*

Rizzo et al., "Spatial Organization using self-organizing Neural Networks",, 2002.*

Powers et al., "The magic Science of visualization", 2003.*

Tamara Munzner, Visualizing the structure of the world wide web in 3D hyperbolic space, ACM, 1995.*

Nicholas G. Tomaiuolo, "Answers.com and Xrefer: The Chevy and Bimmer of Ready reference", Jul./Aug. 2005.*

Dittenbach et al., "Using a Connectionist Approach for Enhancing Domain Ontologies: Self-Organizing word category maps revised", 2003.*

Benford et al., "Three Dimensional Visualization of the World Wide Web", 2000.*

* cited by examiner skating and blading sports
swimming and diving reptiles and amphibians computers and games
sports and recreation solar system science and nature
united states
zoos and aquariums                    world wide web
toy story around the world    boxing day
rap and hip-hop        countries
stuffed toys           art history
teddy bears              cars and trucks
television shows
tall tales       activities  holidays
     fairy tales
        cartoons  movies   toys      toys of the past
religious stories  stories      arts and entertainment
language arts
                music                     action figures
stories by young writers
                        actors       virtual pets
social studies  school bell            giga pets young musicians
jokes and riddles
brass and wind instruments
stringed instruments
                    folk and traditional   comics and animation
drums and percussion
clubs and organizations   fun and humor academic programs

FIG.1 skating and blading sports
swimming and diving reptiles and amphibians weather computers and games sports and recreation solar system science and nature united states zoos and aquariums     world wide web toy story physics   science around the world  boxing day rap and hip-hop          countries
    stuffed toys  paleontology
                              art history
    teddy bears  physical sciences
                                 cars and trucks    astronomy and space
         television shows
tall tales              activities  holidays              aquatic life
         fairy tales     nature
                 cartoons movies   toys      toys of the past  botany
religious stories  stories        arts and entertainment
    language arts                                              biology
              music   medicine
                                                action computer science
    stories by young writers  actors living things   virtual pets       chemistry
social studies  school bell              giga pets  environment
                           inventions          ecology
                    young musicians geology
         jokes and riddles
                                      history of science
     brass and wind instruments
  stringed instruments
                              folk and traditional   comics and animation
            drums and percussion
clubs and organizations      fun and humor academic programs

FIG.6 airplanes and flying measurements and units    spacecraft                                                york
                          solar system
                          astronomy and space
                                              united kingdom prehistoric animals        museums and exhibits
inventions
                                              unites states    florida
       machines                            california    zoos and aquariums
                     paleontology    canada    around the world
                  the earth    volcanoes    countries
                                  new zealand                         hawaii
              geology                australia
                          science and nature
reptiles and amphibians    weather    environment
                                              birds physics    ecology
              chemistry                              mammals
physical sciences    biology
                                              invertebrates    aquatic life
       medicine                        living things human spaceflight
                          botany cars and trucks
history of science computer science
                     diseases and conditions
                     health and safety

FIG.7 trilobites                                          airplanes and flying   uc museum of paleontology measurements and units      spacecraft                                              york
types of dinosaurs          solar system
                            astronomy and space
                                                           united kingdom prehistoric animals        museums and exhibits
                                  saber-toothed tigers united states  florida
inventions
     machines           paleontology          california      zoos and aquariums
                                                canada   around the world
             the earth         volcanoes      countries
                                   new zealand                      hawaii
             geology             australia
                           science and nature
                      weather    environment           archaeopteryx
reptiles and amphibians
                           mastodons             birds  brontotherium
        physics    ecology
                         mammoths
             chemistry                            mammals
                            biology              dire wolves
physical sciences
                                            invertebrates      aquatic life
        medicine      ichthyosaur fossils
                                    living things
                           giant sloths
                 human spaceflight
                            botany cars and trucks
    history of science computer science
                           diseases and conditions
                           health and safety

FIG.8 uc museum of paleontology museums and exhibits california prehistoric animals videos        pictures                           the earth science and nature         fossils sounds                                                                        geology paleontology mammals biology evolution genetics

FIG.9 swimming and diving traditional and board games
typing
reptiles and amphibians
word games
computers and games
sports and recreation solar system science and nature
united states
zoos and aquariums reviews sega world wide web
toy story
prediction games screen savers and wallpaper
around the world    boxing day
sports games
stuffed toys nintendo art history
teddy bears online games cars and trucks
television shows
tall tales        activities holidays                    animal games
   fairy tales
       cartoons movies toys toys of the past apple computer
religious stories stories    arts and entertainment   clip art
language arts
                   music microsoft xbox computer and video games
stories by young writers actors                action figures
social studies school bell             virtual pets   consoles and systems
                                giga pets
                      internet tutorials
                   young musicians           cheats, hints, and codes
                jokes and riddles brass and wind instruments
stringed instruments
                       folk and traditional  comics and animation
    drums and percussion
clubs and organizations      fun and humor academic programs

FIG.10 traditional and board games
software companies sports games            animal games            typing matching games
online games prediction games    word games
                    mazes        sonic the hedgehog series
     shareware
                                               web page design
                    puzzles
                              clip art
                    history            world wide web
        sony playstation       halloween              apple computer
        microsoft xbox  reviews   pictures    safety
        nintendo                  computers and games
        consoles and systems  pokemon
                                                    internet tutorials
  sega    cheats, hints, and codes    entertainment
                                        screen savers and wallpaper
                computer and video games
                      titles
                          backyard sports        animals and nature
                      roller coaster tycoon
microsoft corporation
                                  crash bandicoot series
        monkey island series
              dbz hyper dimension
       mega man    donkey kong series ethics game companies

FIG.11 traditional and board games   tangrams
tetris              software companies sports games          animal games          typing matching games
online games ⊙
prediction games    word games
     shareware      mazes       sonic the hedgehog series
                                          web page design
              puzzles
                        clip art
                 history           world wide web
             presidency
sony playstation         halloween          apple computer
microsoft xbox   online   pictures   safety
nintendo      computers and games
    consoles and systems                    anagrams
                          pokemon
                                            internet tutorials
sega   cheats, hints, and codes  entertainment
                                    concentration
                                screen savers and wallpaper
         computer and video games    chess
              titles                checkers
                    backyard sports
                   roller coaster tycoon   animals and nature
microsoft corporation
                         hangman
                        crash bandicoot series
    monkey island series
           dbz hyper dimension
    mega man   donkey kong series ethics game companies

FIG.12 tangrams shareware sports games tetris animal games concentration                videos
checkers
scrambles and sliders    traditional and board games tic tac toe
online games
computers and games
word searches crossword puzzles anagrams
chess                                       word games history
                          mazes        hangman
prediction games matching games

FIG.13 american business women's association recreation stay-at-home mothers business and economy
shopping and services training risk review menopause movies and film mom
tip             resource
work   business
parenting          organizations
feature  home   information
life      travel   sports
style   fitness
entertainment
magazines                health
love
beauty  relationship  finance   web directories
fashion   family title ix   gender equity
by culture or group education
cultures and groups
women's studies
college and university departments and programs
feminism news and media         women's health          cooking
lesbian, gay, bisexual, and transgendered
dating care chats and forums

FIG.14 romance spa column rama world profile web parenting
links
entertainment online
catalog
nutrition business guide
relationship article dating
pageant style health
protest fitness travel women books
love magazines
beauty
music
fashion ten
female
link game tip tv
american
parent celebrity
money gossip
guy horoscope
food celeb decor guilt pain
concentrate

FIG.20 talk       ten                              column spa parent              business   travel                    dating
              tip article    magazines    guide
                        health
money              beauty  women
                   fashion
guy music
                   style game food crush decor        horoscope
                    celebrity   gossip

FIG.22 zines american business women's association recreation stay-at-home mothers business and economy
shopping and services training risk mom   sharing         title ix   gender equity
tip  quiz   resource              by culture or group
    work business
review   parenting      organizations
   feature  home   information
menopause       life   travel  sports   education
                                cultures and groups
         style   fitness                adventure
                                                women's studies
         entertainment   college and companion departments and programs
  magazines       health       feminism
       love
                relationship   finan destination tories
trips
movies and film   beauty   family
         fashion       festival
            idea news and media
             women's health      cooking
  lesbian, gay, bisexual, and transgendered
         dating care chats and forums

Education

Directory > Education

INSIDE YAHOO!

Yahoo! Education – K–12 Schools – Colleges – Online Degrees – Reference

CATEGORIES (What's This?)

Top Categories

- Adult and Continuing Education (276)
- Browse by Region (168)
- By Culture or Group (306)
- By Subject (974)

- Distance Learning (672)
- Higher Education (17246) NEW!
- K–12 (54564) NEW!

Additional Categories

- Academic Competitions (92)
- Bibliographies (7)
- Bilingual (17)
- Business to Business@
- Career and Vocational (302)
- Chats and Forums (22)
- Conferences (28)

- Job and Employment Resources@
- Journals (39)
- Legislation (10)
- Literacy (33)
- News and Media (83)
- Organizations (2490)
- Policy (48)

SPONSOR RESULTS

Education Degree Study
Earn a doctoral, master's or bachelor's degree online at Walden....
info.waldenu.edu Earn an Accredited Degree Online
US or Canada residents find an online degree in business,....
www.nextag.com Over 65 Online Degrees and Courses
Canyon College offers online Bachelor, Masters and Doctorate degrees.
www.canyoncollege.edu Free College Education Information
Find the school that's right for you.

CONVENTIONAL ART
FIG. 27

GUI FOR SUBJECT MATTER NAVIGATION USING MAPS AND SEARCH TERMS

CROSS REFERENCE TO RELATED APPLICATIONS

This application is a continuation of U.S. patent application Ser. No. 12/028,821, Filed: Feb. 10, 2008, entitled GUI FOR SUBJECT MATTER NAVIGATION USING MAPS AND SEARCH TERMS, now U.S. Pat. No. 7,529,743, which is a continuation of U.S. patent application Ser. No. 11/957,281, filed 14 Dec. 2007, entitled GUI FOR SUBJECT MATTER NAVIGATION USING MAPS AND SEARCH TERMS, now U.S. Pat. No. 7,610,185, which is a non-provisional of U.S. Provisional Patent Application No. 60/891,542, filed Feb. 26, 2007, entitled GUI FOR SUBJECT MATTER NAVIGATION USING MAPS AND SEARCH TERMS, which are all incorporated herein by reference in their entirety.

BACKGROUND OF THE INVENTION

1. Field of the Invention

The present invention relates to techniques for navigating categorized information using a graphical user interface.

2. Description of the Related Art

One of the issues in modem search engine development is allowing the user to navigate pre-categorized information, which is arranged by theme, or subject matter. For example, on Yahoo, it is possible to view a tree-like taxonomy of information that has been indexed by Yahoo. The structure of this taxonomy is tree-like, moving from the broadest level, to more detailed, and so forth. To navigate the tree, the user clicks on links (which represent branches and sub-branches of the tree), which the user views as most relevant to his particular interests, and therefore likely to lead to the document that he is searching for. Examples of this tree structure are illustrated in the screen shots in FIGS. 25-27, in this case, with the subject matter centered around "kids/children."

One of the difficulties for most users with such tree-like structures is the fact that the human mind does not normally operate in this fashion—for most people, information is not structured into a tree, but has many connections between branches of the tree, sub-branches of the tree, connections between sub-branches of different branches, and so forth—in other words, information, as perceived by the human mind, has many more connections and inter-relationships than would be obvious from simply organizing it into a tree-like taxonomy.

Another difficulty with the tree-like organization of information is the fact that moving "horizontally," or moving "at an angle" (conceptually), where the user moves from one sub-branch on one level to a different sub-branch, and possibly to a different level, of the tree, is usually not permitted. The user, having "gone down" into a particular branch, sub-branch, sub-sub-branch, etc., and having discovered that the information there is not what he is seeking, needs to go back "up" the tree, and repeat the process again for a different branch, sub-branch, etc. This is a fairly cumbersome method of navigating organized information, and is one reason why many users are in fact unaware that a search engine, such as Yahoo, provide for this form of searching for information—while such an organization makes it easy for structuring searches in a computer, it is counter intuitive to most people, and therefore, frequently useless.

Accordingly, there is a need in the art to enable users to navigate information organized by subject matter or theme, in an intuitive and easy to understand manner.

SUMMARY OF THE INVENTION

Accordingly, the present invention is related to a system, method and computer program product for using graphical maps as a user interface for navigation of categorized information that substantially obviates one or more of the disadvantages of the related art.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 1-13 illustrate an exemplary use of the present invention for navigating the subject matter of kids/children.

FIGS. 14-24 illustrate an exemplary use of the present invention for navigating the subject matter of women/women's issues.

Figure 25:
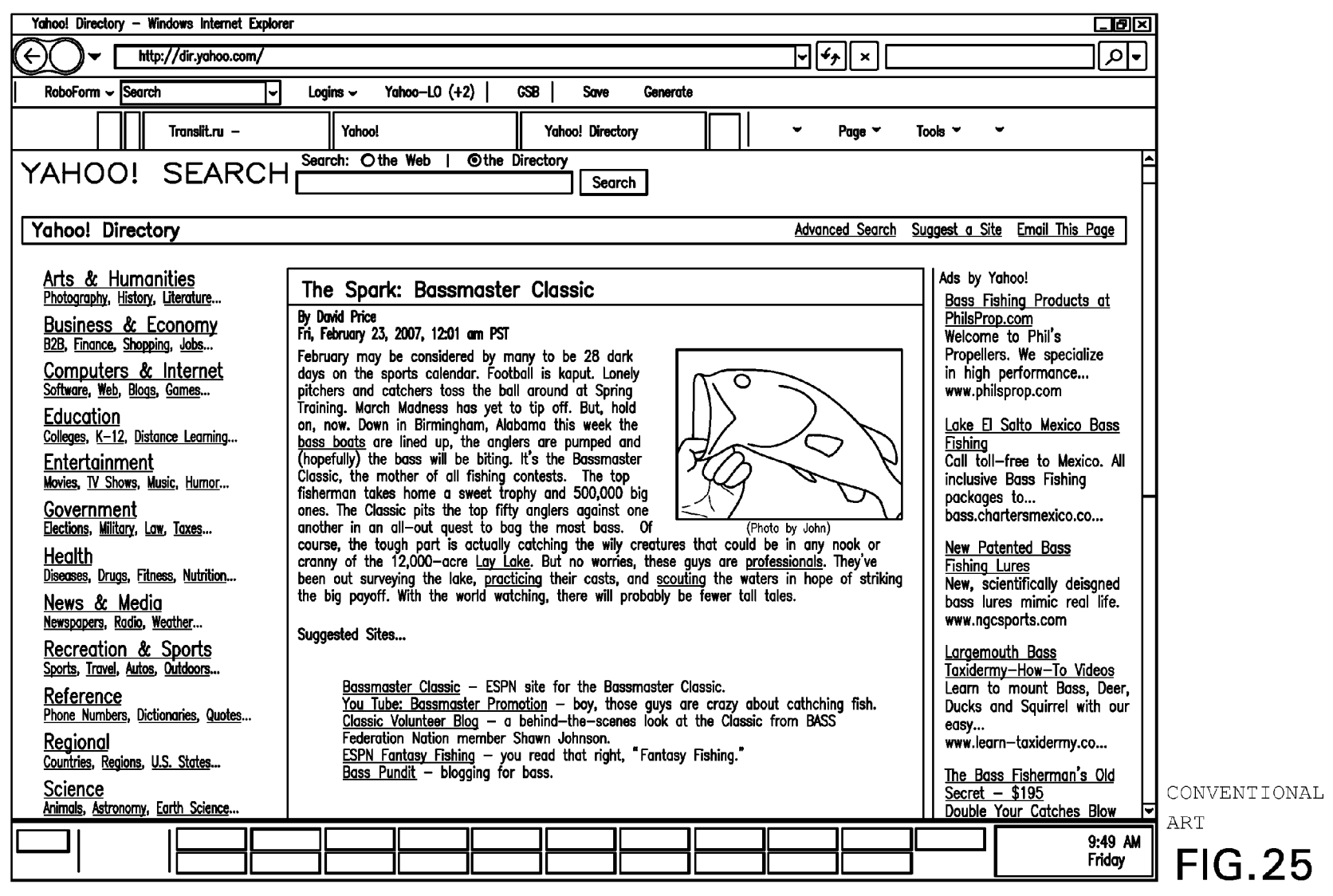
Figure 27:
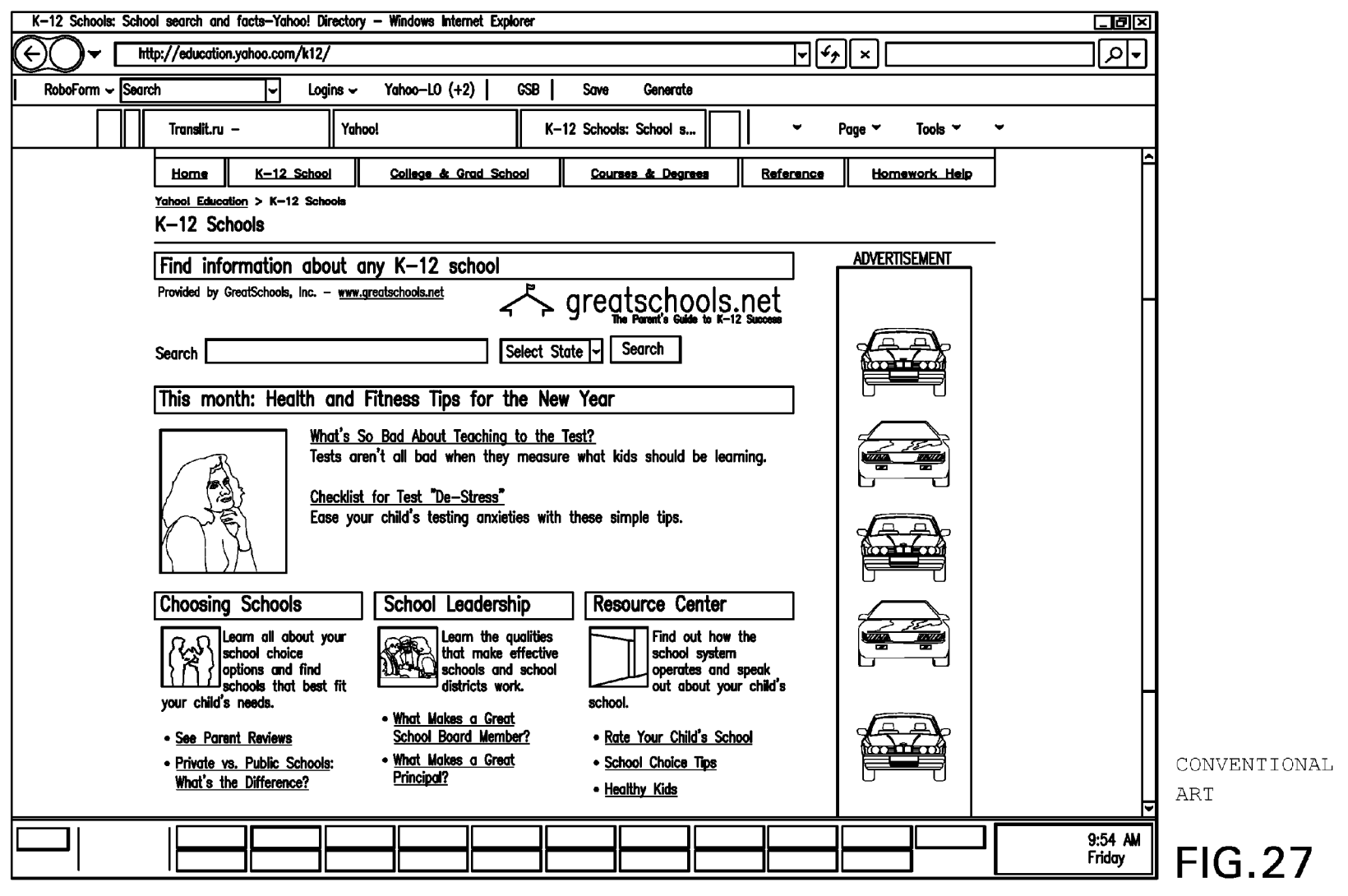

FIGS. 25-27 show screenshots of a conventional tree-like organization of information.

DETAILED DESCRIPTION OF THE PREFERRED EMBODIMENTS

Figure 2:
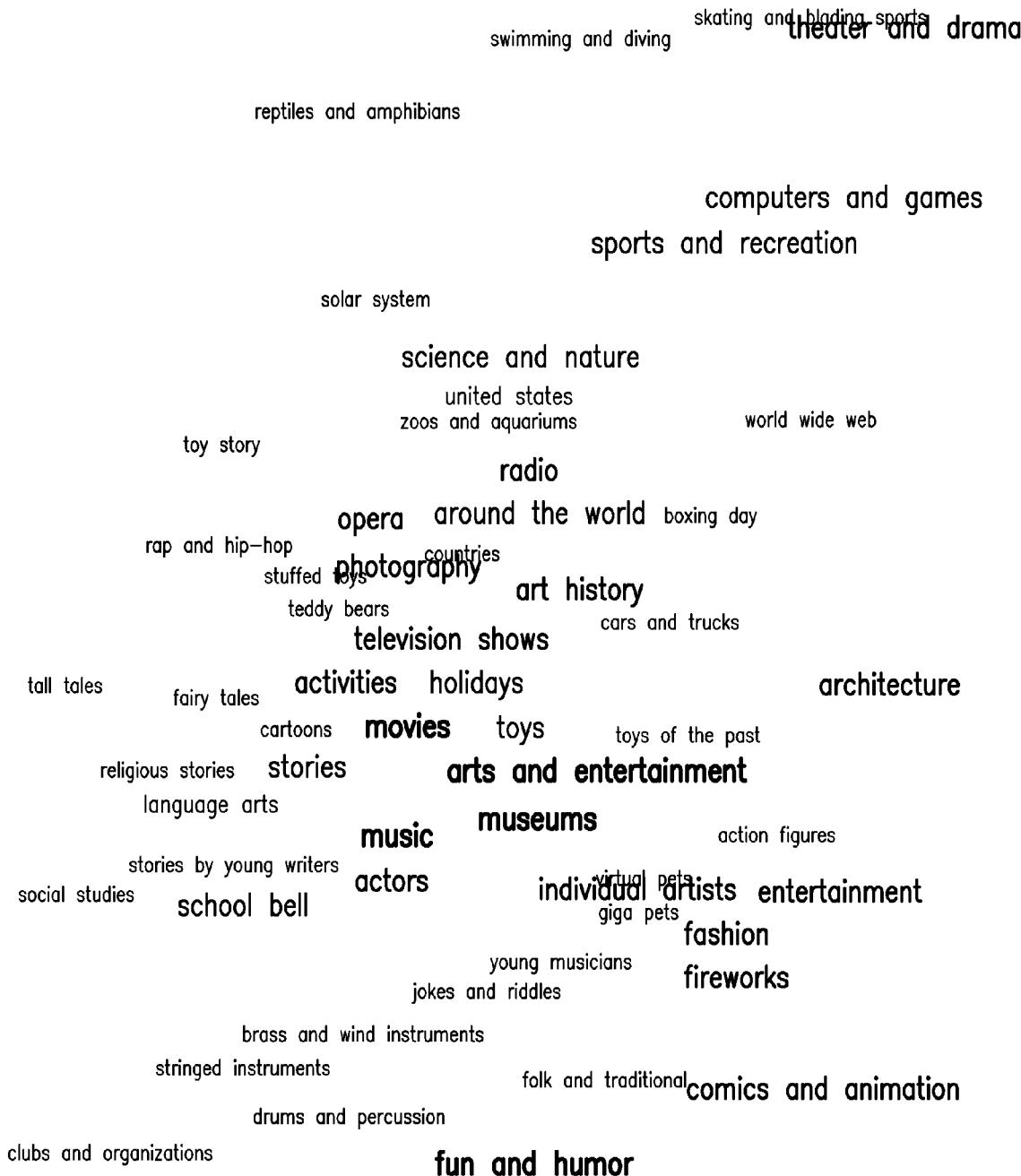

Reference will now be made in detail to the embodiments of the present invention, examples of which are illustrated in the accompanying drawings.

The approach described herein relies on neural networks, such as described in U.S. patent application Ser. No. 11/468,048; Filed: Aug. 29, 2006, entitled NEURAL NETWORK FOR ELECTRONIC SEARCH APPLICATIONS, now U.S. Pat. No. 7,7620,607, incorporated herein by reference, to formulate a multi-dimensional map, on which words, corresponding to search terms and subject matters, are represented. Such a map can then be used for navigation. Also, such a map can be combined with displays of links to the web pages at issue, as well as annotations, such as described in U.S. patent application Ser. No. 11/535,306; Filed: Sep. 26, 2006, entitled USE OF NEURAL NETWORKS FOR ANNOTATING SEARCH RESULTS, now U.S. Pat. No. 7,496,548 and Provisional U.S. Patent Appl. No. 60/890,507; Filed: Feb. 19, 2007, entitled SEARCH ENGINE GRAPHICAL INTERFACE USING MAPS AND IMAGES, both of which are incorporated herein by reference in their entirety.

The neural network underlying each such pre-made map can be initially created, as described in U.S. patent application Ser. No. 11/468,048, now U.S. Pat. No. 7,7620,607, incorporated herein by reference in its entirety, from a set of documents that are known a priori to relate to the particular subject matter. These documents can be manually pre-selected, or can be generated based on an index available from search engines, such as from Yahoo, Inc., or can be generated based on a number of broad, intermediate, and narrow searches that (in the view of the searcher) relate to the subject matter. In this discussion, two examples are used, "children" and "women," chosen in this case primarily because of the breadth of the subject matter. As will be recognized by one of ordinary skill in the art, the breadth of the subject matter means that if the information were structured and presented as a taxonomic tree, the tree would have many levels in its hierarchy (branches, sub-branches, sub-sub-branches, etc.). Therefore, these two examples provide a good illustration of how the organization of the information using neural networks is done, and how navigation of such information is then performed, using the approach described herein.

Once the initial set of documents is chosen, and an initial map is constructed, it is also possible to edit the map manually, if desired. For example, if the subject matter is children (and the map is intended to be of interest to children), the map can be manually edited to exclude adult-related material, pornographic material, or anything that accidentally ended up included in the map, but is subjectively believed, by whoever constructs the map, to not belong there.

Also, if a particular subject matter is believed to be closely related to the subject matter at issue, additional searches can be performed to identify documents related to that related subject matter, and those documents (or, equivalently, a map corresponding to the documents) can be merged into the neural network that underlies the pre-made map at issue.

In this manner, a number of such maps can be created, for each subject matter, and it will be appreciated that each such map corresponds to a branch of a tree in a conventional search engine's index, or, equivalently, to a directory. Furthermore, the map can be modified over time, for example, if it is observed that certain search terms, or combinations of search terms, or subject matter underlie those terms, is of higher than expected interest to most users, the relative importance of those terms can be increased, which would result in a modified map. That map can then be presented to users as "the" map for "children."

FIG. 1 illustrates an exemplary pre-made map for the subject matter "children." As will be seen in FIG. 1, the subject matters, or themes, within the broader category "children" that are of a particular importance are highlighted in bold (in essence, corresponding to branches from the "children" tree, or, equivalently, subdirectories within the "children" directory). This map, as discussed earlier, can be pre-made.

FIG. 2 illustrates an example of how the map can be navigated. By bringing the cursor to the "arts and entertainment" search term (see the hand-shaped icon near the words "arts and entertainment" in the map), the map is rearranged, so that some of the search terms become less important (for example, "computers and games," which used to be highlighted, is no longer highlighted, indicating that it is less relevant to the user who is interested in the subject matter of the sub-branch "arts and entertainment").

Figure 3:
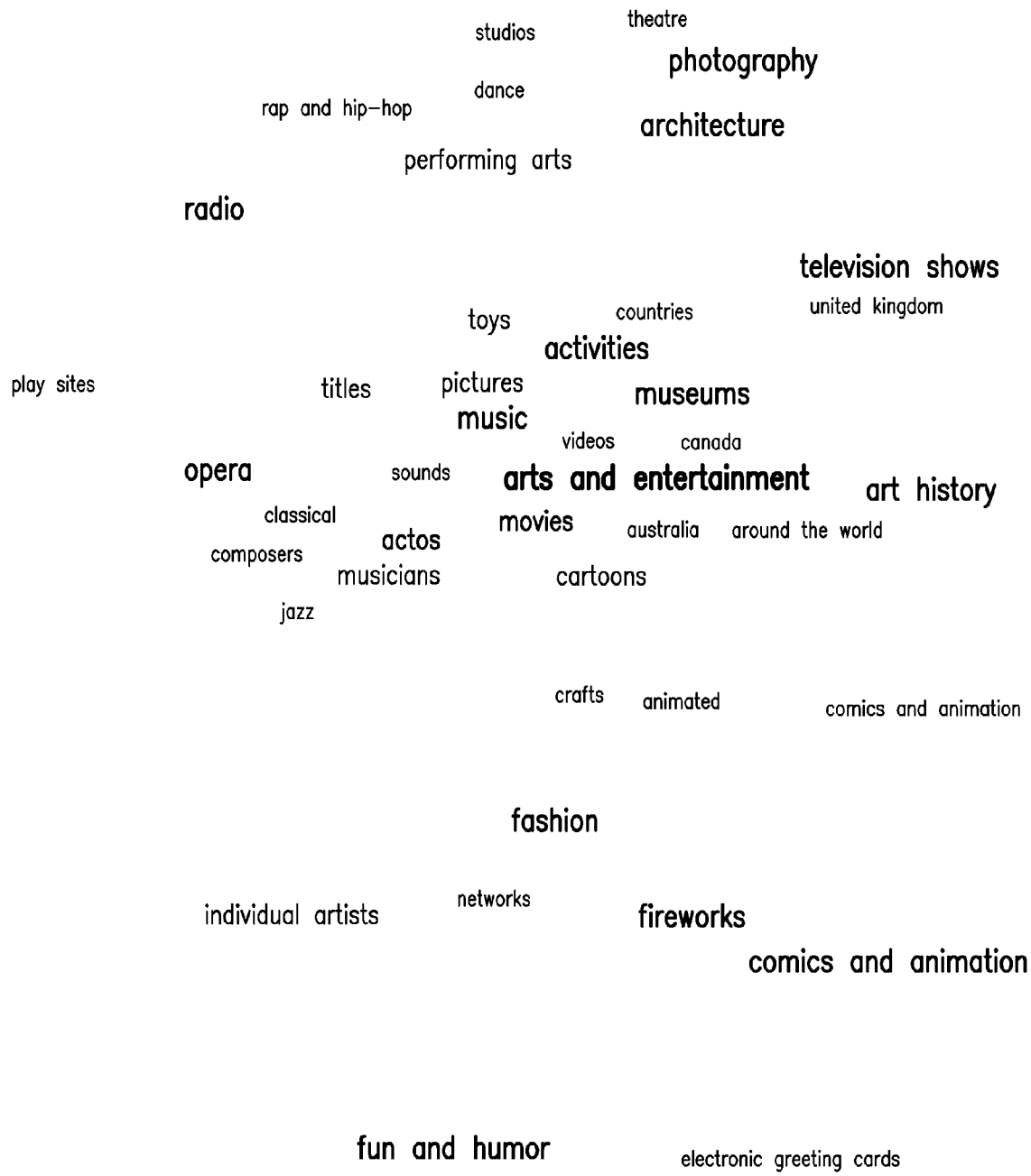

FIG. 3 illustrates what would happen to the map if, in addition to bringing the cursor over to "arts and entertainment" the user clicked on this search term. The map, as will be seen, is again rearranged, with, in this case, font size indicating relative importance of the displayed search terms (as well as the distance on the screen from the primary search term ("arts and entertainment")) to the other search terms (including newly displayed ones). In other words, the manner of display of each search term is dynamic (as opposed to static), with the display incorporating the "depth" of the search term, as far as its relevance to the current search is concerned, based on the underlying neural network. As such, the map may be conceptually viewed as a three-dimensional map, with the two dimensions displayed on the screen in the sense of X and Y, and the third dimension (depth into the tree branch) displayed graphically using such artifacts as font, color, transparency, animation effects, etc. When the user performs some operations on the map (e.g., deleting a term, or emphasizing importance of the term), the map is rearranged (e.g., the coefficients in the underlying neural network change0, and the same term can appear different on the screen (different font, color, transparency, size, etc.) In effect, by clicking on the term "arts and entertainment," the user selected a taxonomic branch, or directory, within the subject matter "children." Note also that the user does not need to view the process he is going through in terms of initiating additional search engine searches, even though this is what he is in effect doing.

Figure 4:
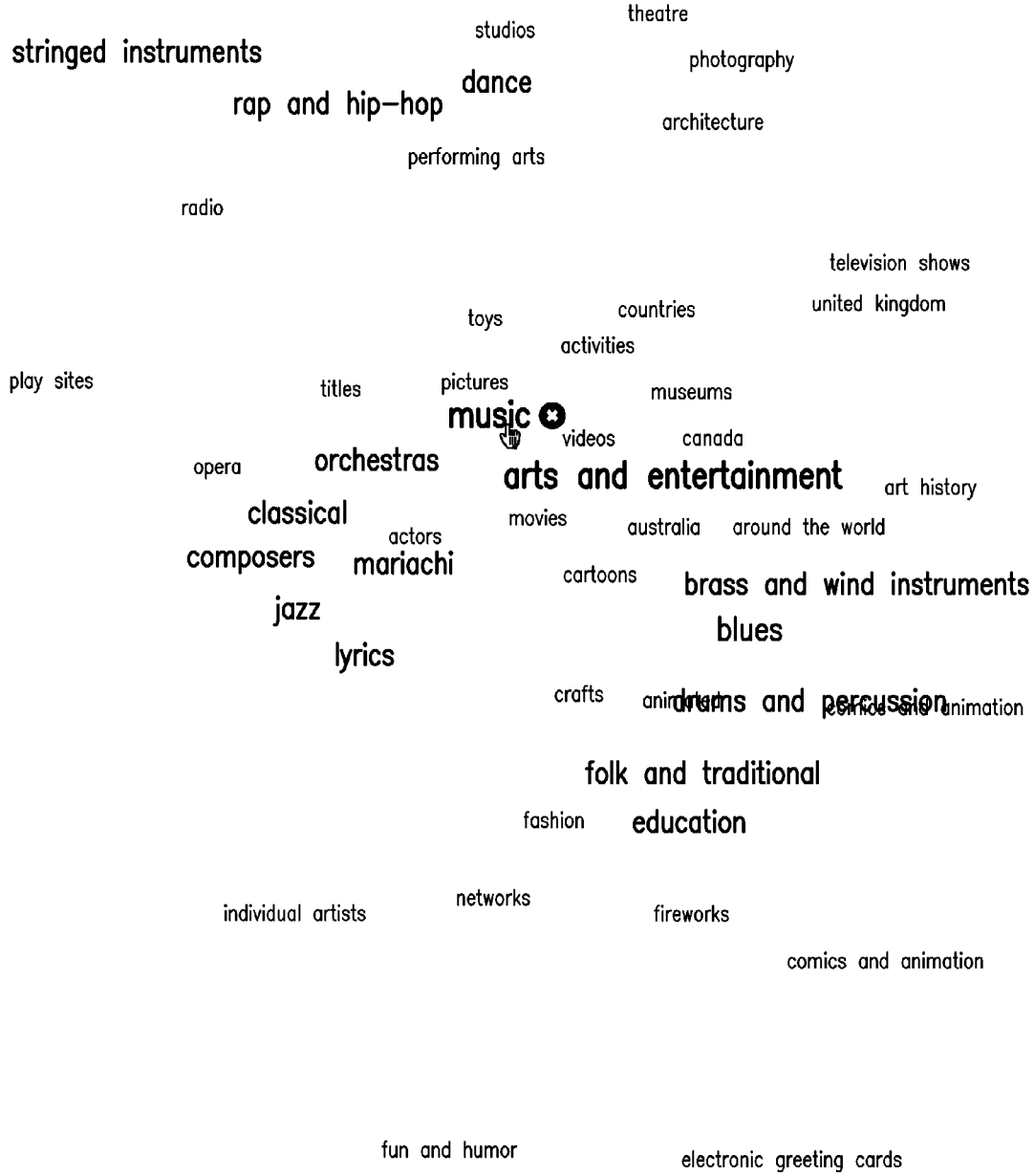

FIG. 4 illustrates an additional example of how the map can be manipulated, by bringing the cursor to the search term "music." The map is again rearranged, as illustrated in FIG. 4.

Figure 5:
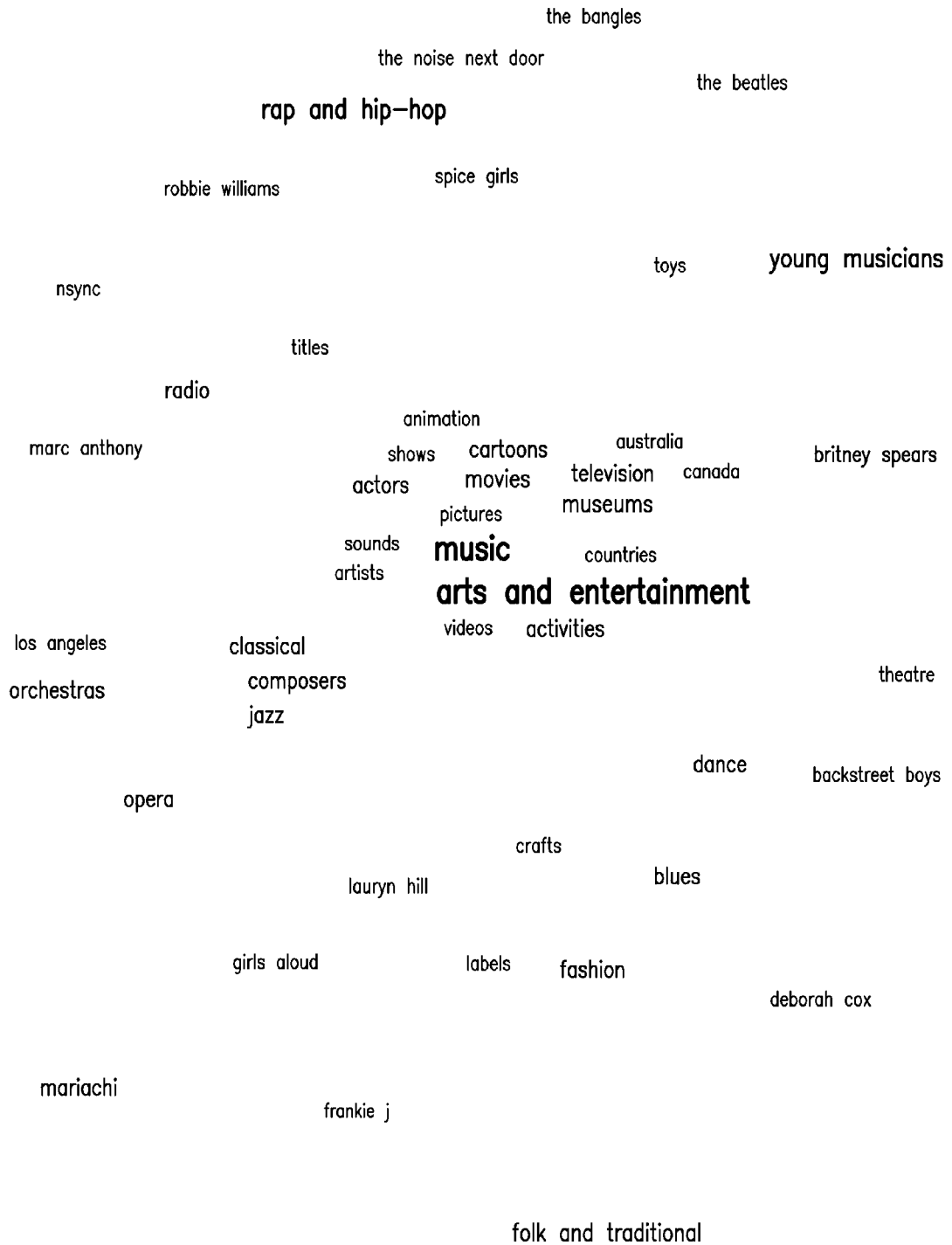
Figure 15:
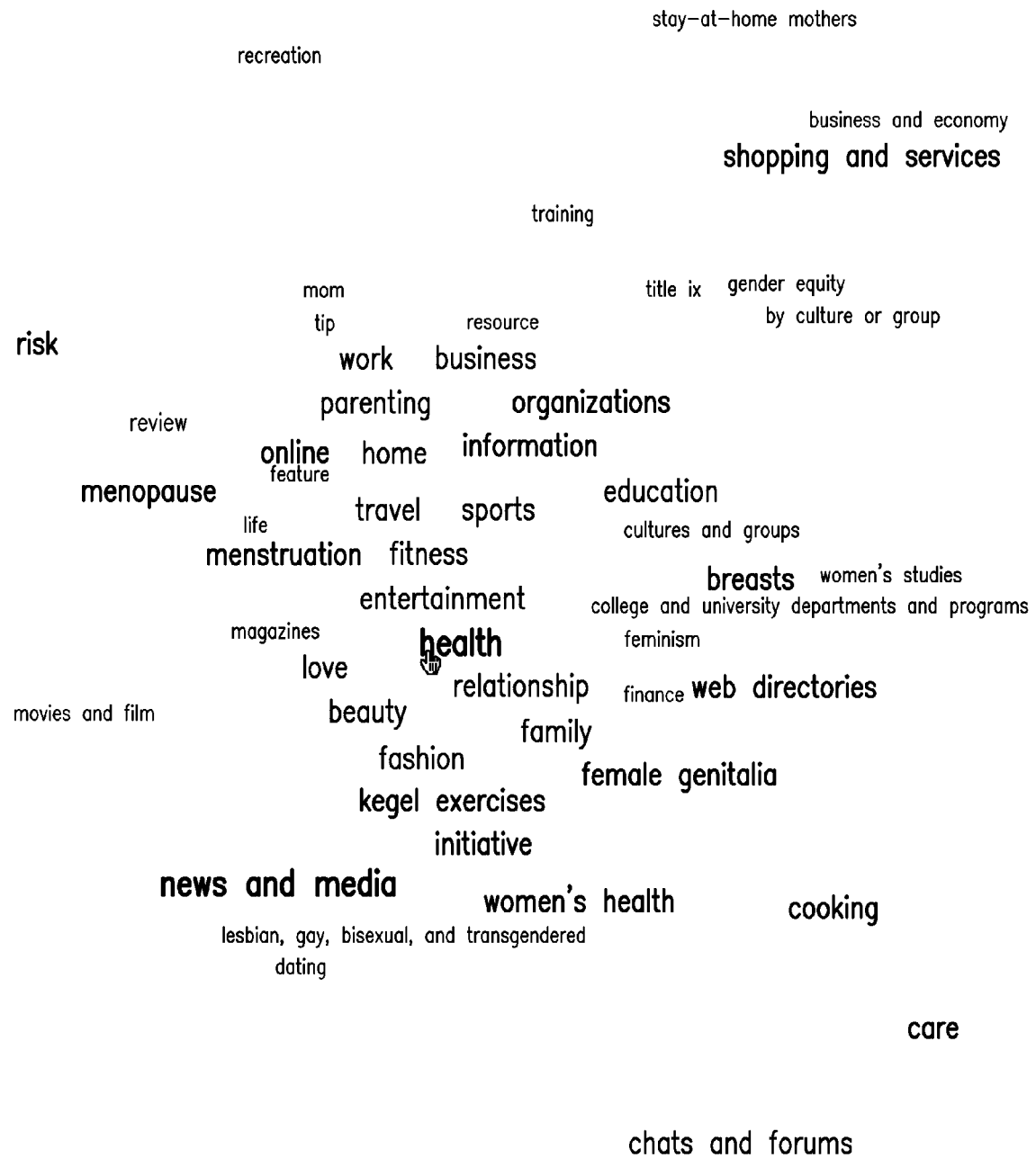

FIG. 5 illustrates what happens to the map when the search term "music" is clicked on. This map represents, in a sense, a combination of the branches "arts and entertainment" and "music"—in essence, the map that is displayed illustrates search terms that are relevant to both of these branches, with location and font size (and, optionally, font color) indicative of those terms that are particularly relevant to both terms "arts and entertainment" and "music," and smaller font being indicative of the search term that is only primarily relevant to one of the two highlighted search terms.

FIG. 6 illustrates how the user can navigate down another branch within the "children" tree, in this case, the "science and nature" branch. In effect FIG. 6 represents FIG. 1, where the cursor is brought over to the "science and nature" term. Note how the map changes from that shown in FIG. 1 to that shown in FIG. 6. By clicking on the "science and nature" search term, the map of FIG. 7 (corresponding to that branch, or directory) is displayed. FIG. 8 illustrates how the map is rearranged when the user brings the cursor over to the "paleontology" search term (i.e., conceptually moving "deeper" into the tree). In FIG. 9, the user has clicked on the term "paleontology," and the resulting map is displayed in FIG. 9.

FIG. 10 illustrates navigation down another branch, in this case, the "computers and games" branch. In this case, FIG. 10 is what results when, in the map of FIG. 1, the user brings the cursor to the "computers and games" search term. FIG. 11 is an illustration of what happens when the user clicks on the search term "computers and games," illustrating how the map changes to correspond to the selection. FIG. 12 illustrates, in essence, traveling, or navigating, down the branch, where the user brings the cursor to the term "online games." FIG. 13 is an illustration of what happens to the map when the search term "online games" is clicked on.

Figure 16:
Figure 17:
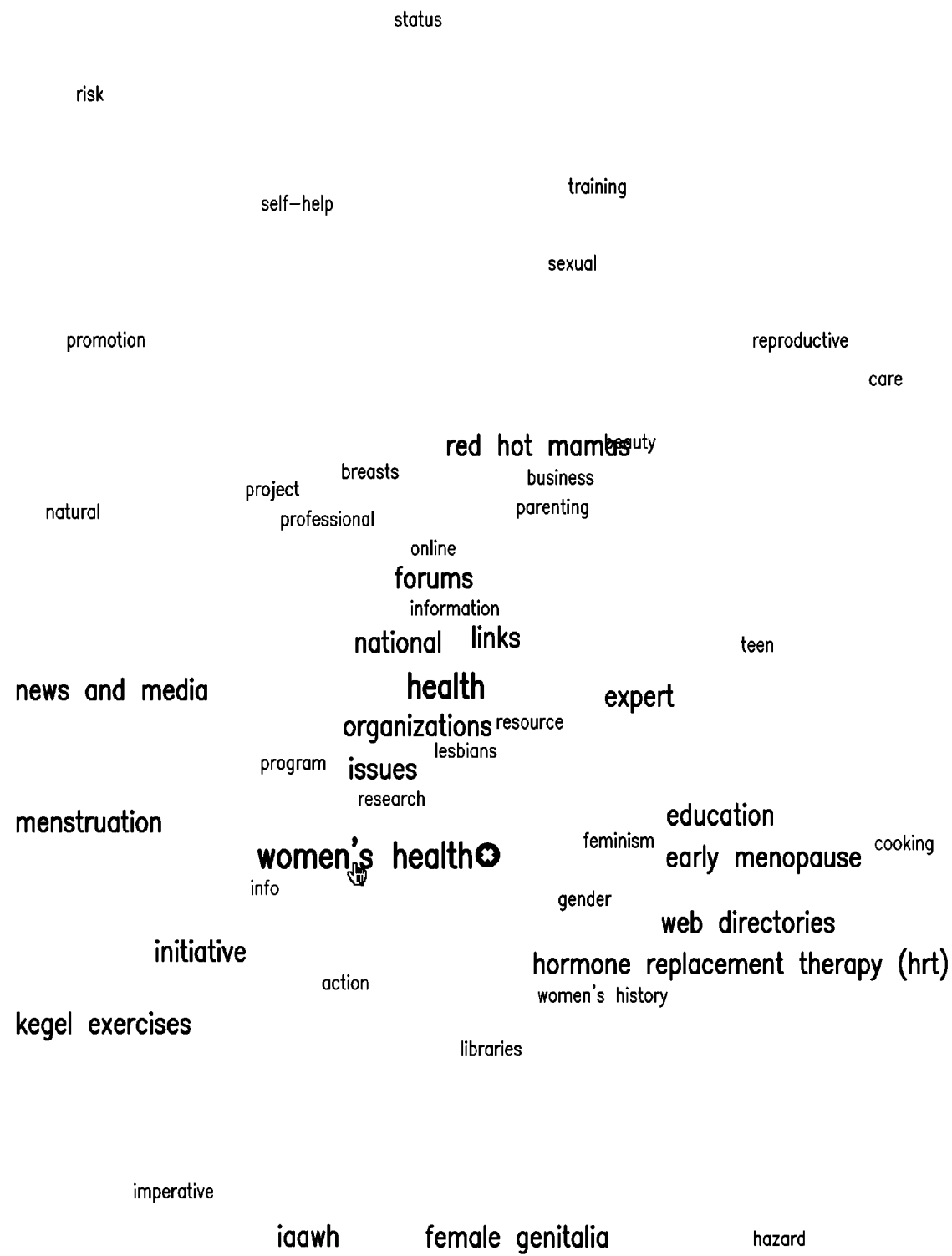
Figure 18:
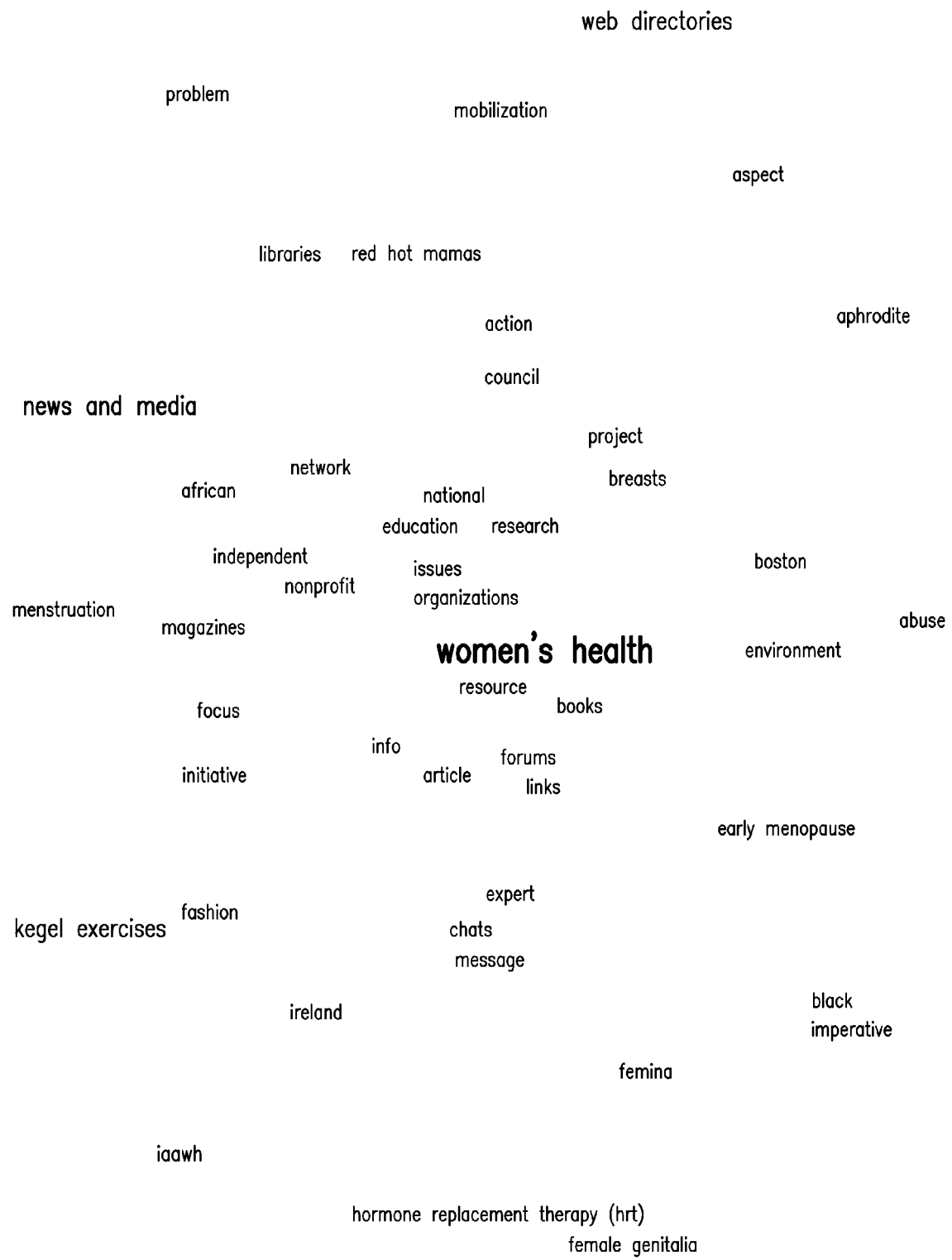

FIGS. 14-24 illustrate how the principles described above apply to another relatively broad subject matter area, in this case, women. FIG. 14 illustrates the map for the subject matter, with a highlighted terms generally corresponding to the branches of the tree—work, business, parenting, home, travel, etc. As with the case of the "children" tree/directory, by bringing the cursor to the "health" term, in FIG. 15, the map changes to show sub-branches under "health". FIG. 16 illustrates the map for the sub-branch "health." FIG. 17 illustrates what happens when the user brings the cursor to the search term "women's health." FIG. 18 illustrates what happens when the user clicks on the term "women's health"—essentially, traveling down into the tree.

Figure 19:
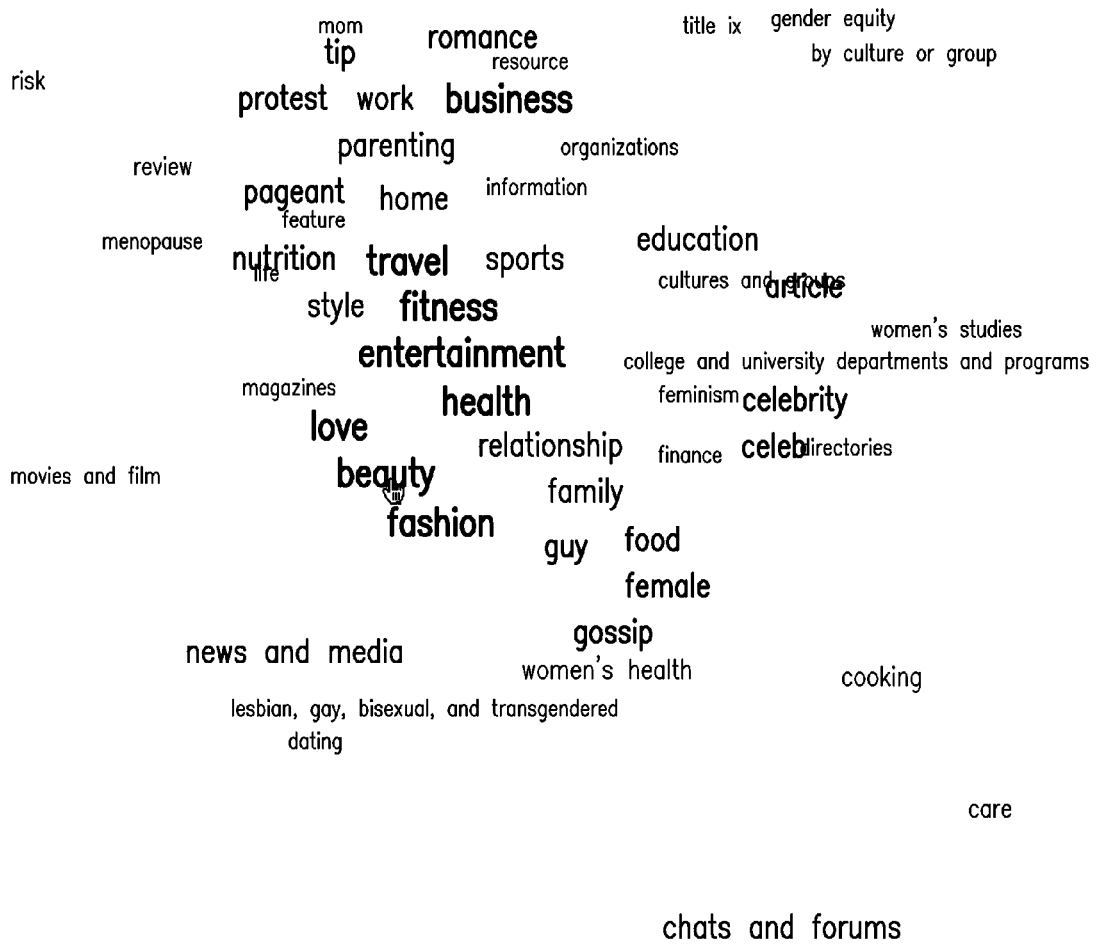
Figure 21:
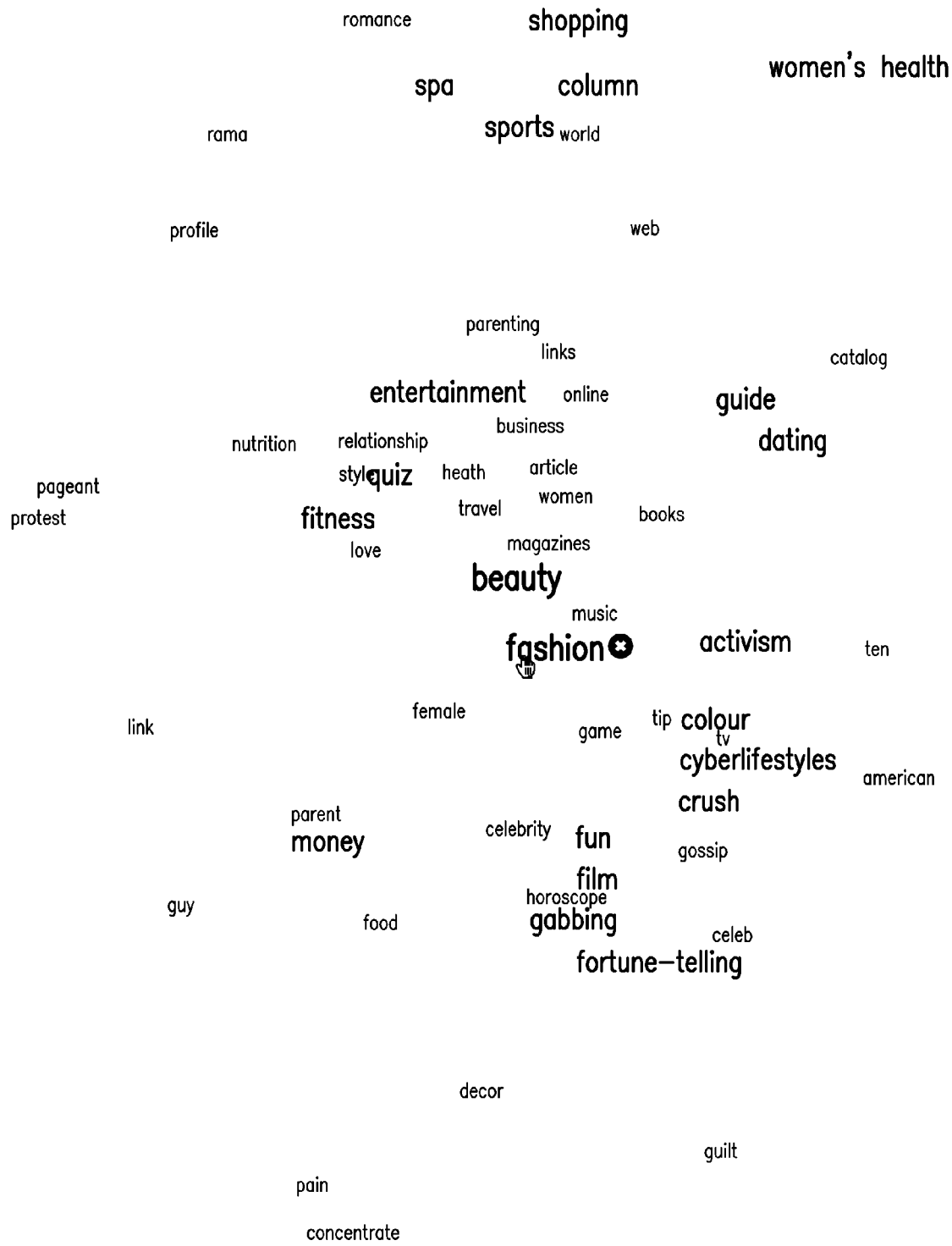
Figure 24:
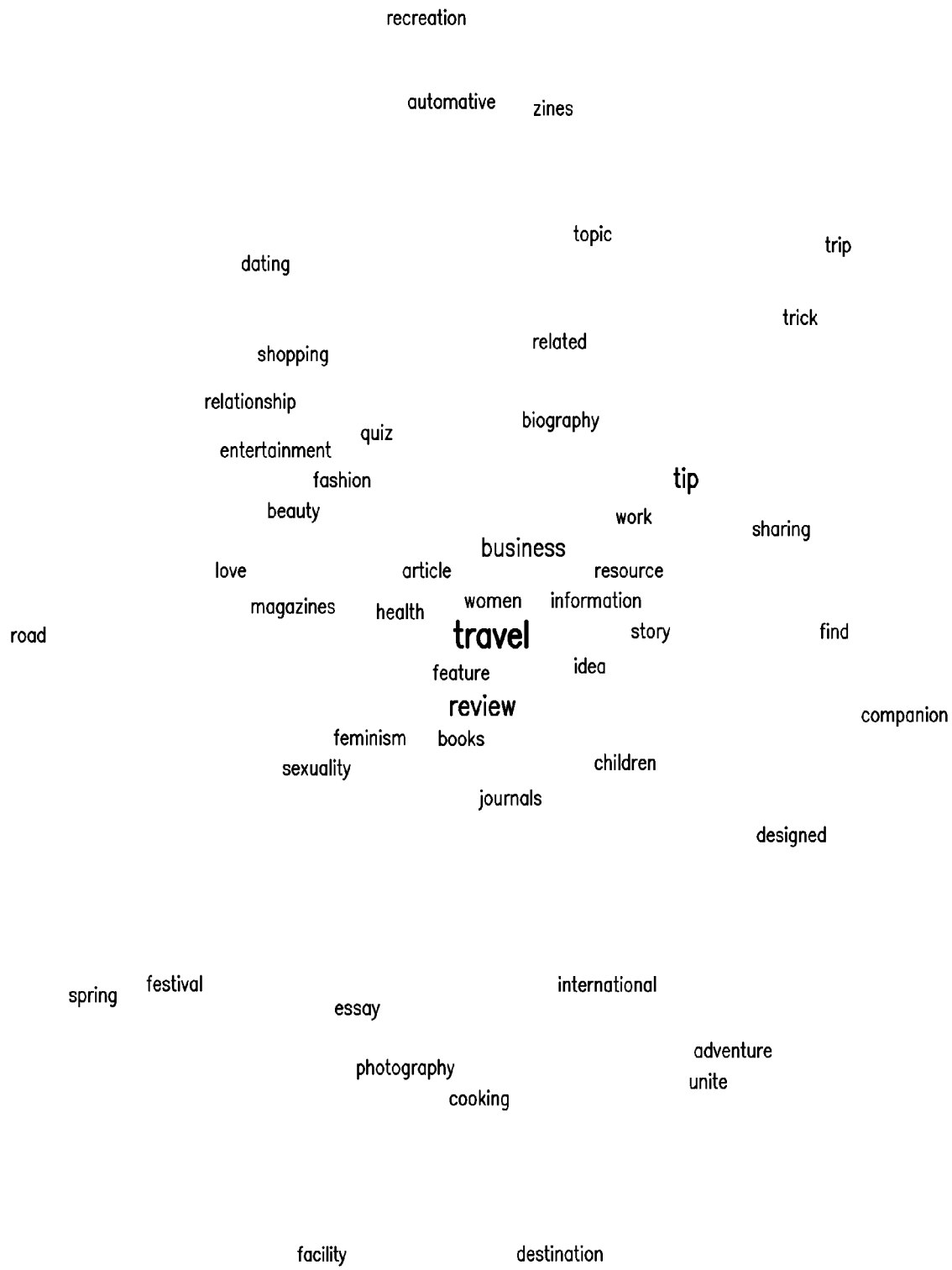

FIG. 19 illustrates the map of FIG. 14, where the user brought the cursor to the search term "beauty." FIG. 20 illustrates the map for the sub-branch "beauty"—in other words, what happen when the user clicks on the term "beauty." FIG. 21 illustrates navigation within the "beauty" sub-branch (directory)—where the user brings the cursor to the term "fashion." FIG. 22 illustrates what happens when the user clicks on the term "fashion." FIG. 23 illustrates the map of FIG. 14, where the user brings the cursor to the search term "travel." FIG. 14 illustrates the map for the "travel" sub-branch (directory).

Furthermore, it will be appreciated that an already existing map (in other words, an already existing neural network) can be used to index other documents, and identify relevant documents out of a larger set of documents.

Figure 28:
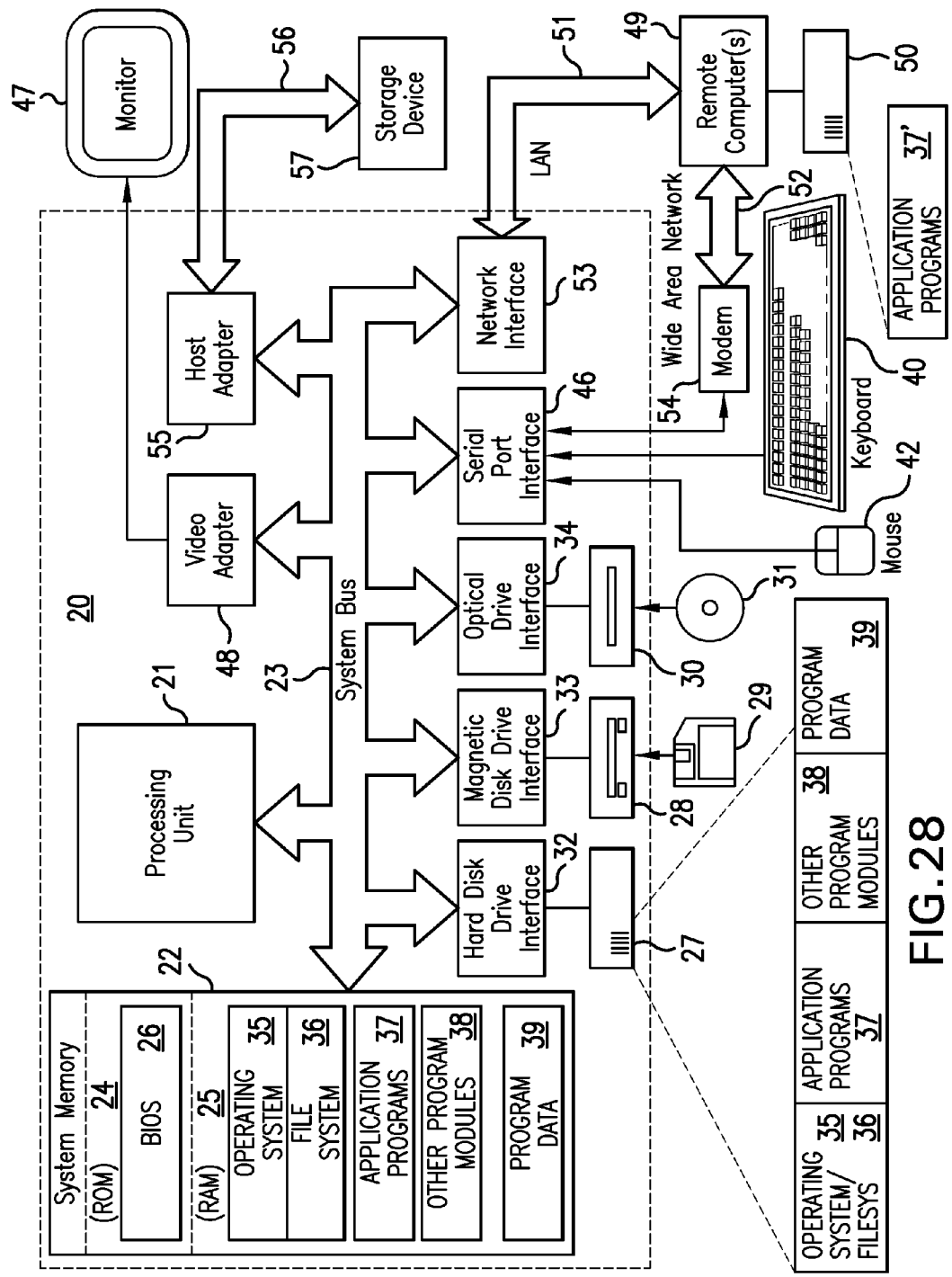
FIG. 28 illustrates an exemplary computer system on which the invention may be implemented.

With reference to FIG. 28, an exemplary computer system, where the invention can be implemented as a system, method and computer program product that includes a computer useable recording medium having computer program logic recorded thereon for executing on at least one processor for implementing the method, and/or including a number of software modules for performing the method steps, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for navigating categorized information comprising:
   a computer configured to:
      display a two-dimensional map comprising a plurality of search terms relating to a subject matter, wherein the plurality of search terms are associated with a plurality of positions;
      modify the plurality of positions based on a new search term;
      display additional related search terms based on the new search term; and
      display a plurality of hyperlinks corresponding to a plurality of search results; and
   a neural network configured to determine the plurality of positions and the plurality of search results based on the new search term and at least one selected search term of the plurality of search terms.

2. The system of claim 1, wherein the neural network is a bidirectional neural network.

3. The system of claim 1, wherein the at least one selected search term is adapted to be selected by an input device.

4. The system of claim 3, wherein the additional related search terms comprise a sub-subject matter associated with new search term.

5. The system of claim 3, wherein modifying the plurality of positions based on a new search term comprises increasing the importance of the new search term in the neural network.

6. The system of claim 3, wherein modifying the plurality of positions based on a new search term comprises decreasing the importance of the new search term in the neural network.

7. The system of claim 6, wherein at least one of the plurality of search terms is associated with an icon.

8. The system of claim 1, wherein the plurality of search terms each comprise a font color, a font size, and a degree of transparency associated with a relevance of each of the plurality of search terms, and the plurality of positions comprise a distance between each of the plurality of search terms associated with the relevance of each of the plurality of search terms.

9. The system of claim 1, wherein at least some of the plurality of search terms correspond to different nodes of the neural network.

10. A method for navigating categorized information comprising:
   displaying a two-dimensional map comprising a plurality of search terms relating to a subject matter, wherein the plurality of search terms are associated with a plurality of positions;
   determining, at a neural network, the plurality of positions and a plurality of search results based on a new search term and at least one selected search term of the plurality of search terms,
   modifying the plurality of positions based on the new search term;
   displaying additional related search terms based on the new search term; and
   displaying a plurality of hyperlinks corresponding to the plurality of search results.

11. The method of claim 10, wherein the neural network is a bidirectional neural network.

12. The method of claim 10, wherein modifying the plurality of positions based on a new search term comprises increasing the importance of the new search term in the neural network.

13. The method of claim 12, wherein the additional related search terms comprise a sub-subject matter associated with new search term.

14. The method of claim 12, further comprising selecting at least one of the plurality of search terms.

15. The method of claim 12, wherein modifying the plurality of positions based on a new search term comprises decreasing the importance of the new search term in the neural network.

16. The method of claim 12, wherein at least one of the plurality of search terms is associated with an icon.

17. An article of manufacture including a computer-readable medium having instructions stored thereon that, if executed by a computing device, cause the computing device to perform operations comprising:
   displaying a two-dimensional map comprising a plurality of search terms relating to a subject matter, wherein the plurality of search terms are associated with a plurality of positions;
   determining the plurality of positions and a plurality of search results based on a new search term and at least one selected search term of the plurality of search terms;
   modifying the plurality of positions based on the new search term;
   displaying additional related search terms based on the new search term; and
   displaying a plurality of hyperlinks corresponding to the plurality of search results.

18. The article of manufacture of claim 17, wherein the plurality of search terms correspond to a neural network and determining the plurality of positions and the plurality of search results comprises exciting the neural network.

19. The article of manufacture of claim 18, wherein the neural network is a bidirectional neural network.

20. The article of manufacture of claim 18, wherein modifying the plurality of positions based on a new search term comprises increasing the importance of the new search term in the neural network.

21. The article of manufacture of claim 18, wherein modifying the plurality of positions based on a new search term comprises decreasing the importance of the new search term in the neural network.

22. The article of manufacture of claim 17, wherein the additional related search terms comprise a sub-subject matter associated with new search term.

23. The article of manufacture of claim 17, further comprising selecting at least one of the plurality of search terms.

24. The article of manufacture of claim 17, wherein at least one of the plurality of search terms is associated with an icon.

\* \* \* \* \*

UNITED STATES PATENT AND TRADEMARK OFFICE
CERTIFICATE OF CORRECTION

PATENT NO. : 7,970,764 B1  
APPLICATION NO. : 12/435050  
DATED : June 28, 2011  
INVENTOR(S) : Ershov Page 1 of 1

It is certified that error appears in the above-identified patent and that said Letters Patent is hereby corrected as shown below:

Column 7, line 22, in Claim 10, delete "terms," and insert -- terms; --.

Signed and Sealed this
Twenty-second Day of November, 2011

David J. Kappos
*Director of the United States Patent and Trademark Office*